United States Patent
Callewaert et al.

(10) Patent No.: US 12,554,586 B1
(45) Date of Patent: Feb. 17, 2026

(54) ACCELERATED RECOVERY IN RDF/STAR AND RDF/STAR-A CONFIGURATIONS

(71) Applicant: Dell Products L.P., Hopkinton, MA (US)

(72) Inventors: Peter Callewaert, Eernegem (BE); Dennis Trulli, Jr., Hudson, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/804,198

(22) Filed: Aug. 14, 2024

(51) Int. Cl.
G06F 11/00 (2006.01)
G06F 11/07 (2006.01)
G06F 11/14 (2006.01)
G06F 11/20 (2006.01)

(52) U.S. Cl.
CPC ...... *G06F 11/1425* (2013.01); *G06F 11/0772* (2013.01); *G06F 11/2025* (2013.01)

(58) Field of Classification Search
CPC ............. G06F 11/1425; G06F 11/0772; G06F 11/2025
See application file for complete search history.

(56) References Cited

U.S. PATENT DOCUMENTS

| | | | | |
|---|---|---|---|---|
| 7,647,525 B2* | 1/2010 | Lecrone | .............. | G06F 11/2069 714/6.12 |
| 10,671,493 B1* | 6/2020 | Bissmeyer | .......... | G06F 11/1464 |
| 2005/0015657 A1* | 1/2005 | Sugiura | ............... | G06F 11/1482 714/E11.008 |
| 2007/0198791 A1* | 8/2007 | Iwamura | ............. | G06F 11/2069 711/162 |
| 2013/0191347 A1* | 7/2013 | Bensinger | ........... | G06F 11/2097 707/649 |
| 2018/0096068 A1* | 4/2018 | Venkataramanappa | ...................... | G06F 11/1471 |
| 2019/0340043 A1* | 11/2019 | Trulli, Jr. | ................. | G06F 9/546 |
| 2022/0374316 A1* | 11/2022 | Kumar | ................. | G06F 11/1451 |
| 2024/0193044 A1* | 6/2024 | Creed | ................. | G06F 11/1435 |
| 2025/0181252 A1* | 6/2025 | Callewaert | .............. | G06F 3/067 |

* cited by examiner

*Primary Examiner* — Philip Guyton
(74) *Attorney, Agent, or Firm* — Anderson Gorecki LLP (57) ABSTRACT

A recovery leg in a Star or Star-A configured data replication system is maintained in a pseudo-active RCVY mode in which personalities of corresponding replicas of a mirror are set to R1 on both sides of the recovery leg, capture cycles are performed, and transmit cycles are discarded. During a recovery operation, tracks are marked for resynchronization in the proper direction and resynchronization is performed if the source side data is not the most recent. Group-level personalities of the replica on the target side of the recovery leg are then set to R2 (the target side multi-session consistency software instance converts the capture cycles to restore cycles, converts the transmit cycles to receive cycles, and swaps the cycle tags between the receive and restore cycles). The RCVY mode and multi-session consistency software instances accelerate transition from RCVY mode to normal operation on the recovery leg.

20 Claims, 13 Drawing Sheets

RDF/Star with Accelerated Recovery - Normal Operations

ACCELERATED RECOVERY IN RDF/STAR AND RDF/STAR-A CONFIGURATIONS

TECHNICAL FIELD

The subject matter of this disclosure is generally related to electronic data storage.

BACKGROUND

Electronic data storage is a critical infrastructure for organizational processes that rely on software. A typical datacenter includes clusters of server computer "hosts" and multiple data storage nodes that are interconnected via network switches. The server computers host instances of applications that support organizational processes such as email, accounting, inventory control, e-business, and engineering. Host application data is maintained by the storage nodes. A "host application image" is all the data for a single host application stored on a collection of logical disk drives that may be referred to as storage objects, devices, or volumes. The logical disk drives that contain a host application image may be collectively referred to as a replication consistency group because all the associated data is replicated in a manner that helps to maintain time-state consistency. The host application image may be replicated at different data centers using a remote data facility (RDF) to enable recovery (failover) between replicas with less significant interruption of the host applications than would occur with a full restoration from backup. Replication may be synchronous (RDF/S) or asynchronous (RDF/A). A primary (R1) replica (aka production or active replica) of the host application image is accessed by the host servers. Secondary (R2) replicas (aka passive replicas) replicate primary replicas and typically are not accessed by the host servers. Recovery may include swapping the R1/R2 "personalities" of the primary and secondary replicas and activating replication over a recovery leg in RDF/Star and RDF/Star-A configurations.

SUMMARY

An apparatus may comprise: a data storage system with a plurality of storage arrays and Star nodes at datacenters in a Star or Star-A configuration with a recovery leg configured in a RCVY mode in which multi-session consistency software instances run on datacenters at both ends of the recovery leg, personalities of corresponding replicas of a mirror are set to R1 on both sides of a recovery leg at activation time, capture cycles are performed on both sides of the recovery leg, and transmit cycles are discarded on both sides of the recovery leg.

A method may comprise: setting personalities of corresponding replicas of a mirror to R1 on both sides of a recovery leg at activation time; performing capture cycles on both sides of the recovery leg; and discarding transmit cycles on both sides of the recovery leg.

A non-transitory computer-readable storage medium may store instructions that when executed by at least one computer in a storage system performs a method comprising: setting personalities of corresponding replicas of a mirror to R1 on both sides of a recovery leg at activation time; performing capture cycles on both sides of the recovery leg; and discarding transmit cycles on both sides of the recovery leg.

The summary does not limit the scope of the claims or the disclosure. All examples, embodiments, aspects, implementations, and features can be combined in any technically possible way and the method and process steps may be performed in any order.

Various features and advantages will become more apparent from the following detailed description of exemplary embodiments in conjunction with the drawings.

DETAILED DESCRIPTION

The terminology used in this disclosure should be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" refer to features that are abstractions of other features, such as abstractions of tangible features. The term "physical" refers to tangible features that possibly include, but are not limited to, electronic hardware. For example, multiple virtual computers could operate simultaneously on one physical computer. The term "logic" refers to special purpose physical circuit elements, firmware, software, computer instructions that are stored on a non-transitory computer-readable medium and implemented by multi-purpose tangible processors, and any combinations thereof. Embodiments of the inventive concepts are described as being implemented in a data storage system that includes host servers and a storage array as the storage node. Such implementations are not limiting. For example, a wide variety of storage nodes might be implemented with the inventive concepts. Those of ordinary skill in the art recognize that there are a wide variety of implementations of the inventive concepts within the scope of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
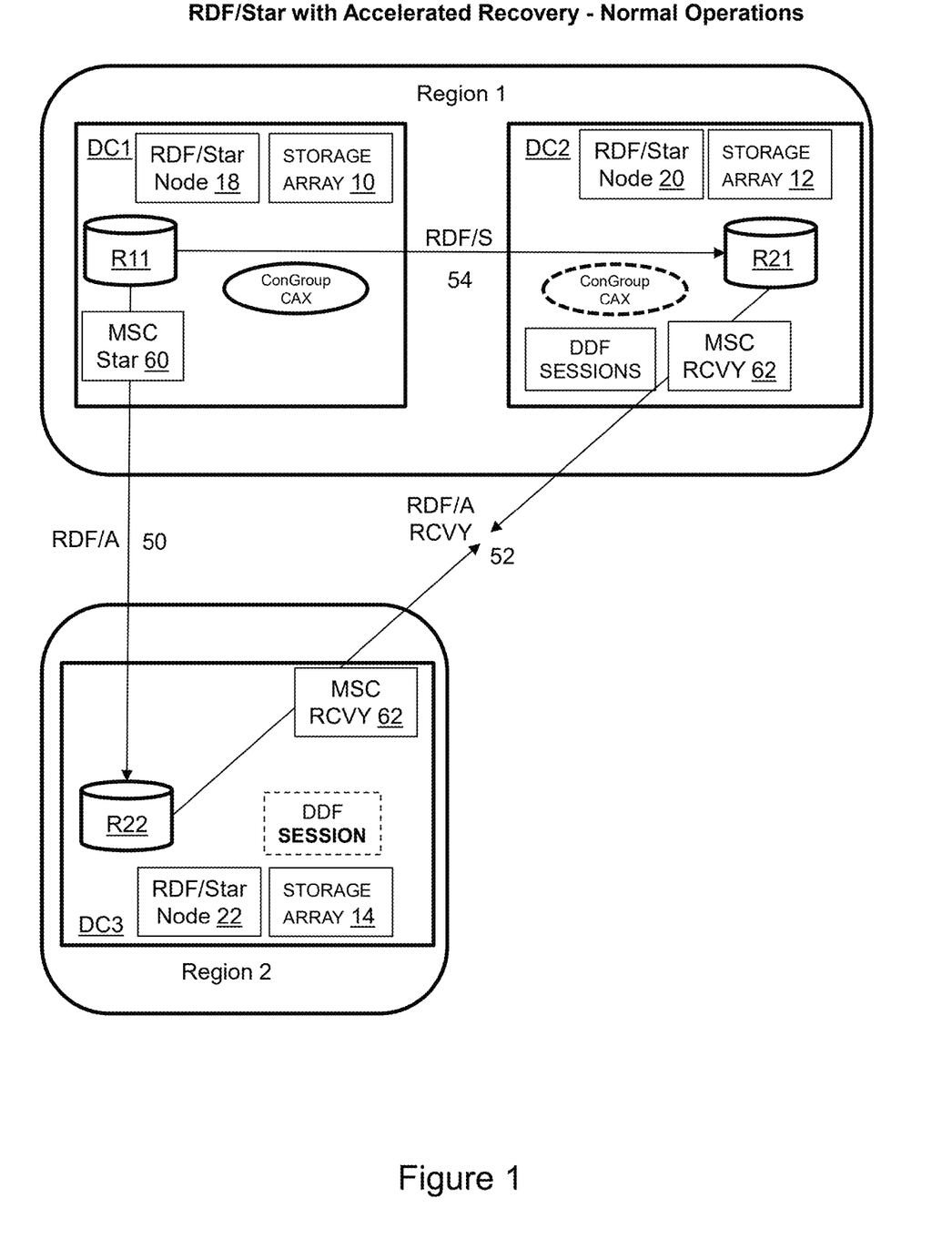
FIG. 1 illustrates normal operations in an RDF/Star configuration with RDF/A RCVY (new recovery) mode and MSC RCVY mode on the recovery leg.

FIG. 1 illustrates an RDF/Star configuration with RDF/A RCVY mode and MSC RCVY mode being used on the recovery leg 52. RDF/Star includes three data centers DC1, DC2, DC3 that are in two geographic regions labelled as region 1 and region 2. Specifically, DC1 and DC2 are in region 1 and DC3 is in region 2. DC1, which is a primary site, includes a storage array 10 and RDF/Star node 18. DC2, which is a secondary site, includes a storage array 12 and RDF/Star node 20. DC3, which is a secondary site, includes a storage array 14 and RDF/Star node 22. The RDF/Star nodes 18, 20, 22 may be implemented on separate logical partitions of different mainframe computers at different sites. Each RDF/Star node monitors its local datacenter for failures such as inter-datacenter communication failures and failures associated with the local storage arrays. Each datacenter is depicted with a single storage array for purposes of explanation but would often include two or more storage arrays.

Replication is performed by source-target replica pairs. An R1 replica is a member of a replication pair at a source (production) site. R1 replicas are generally Read/Write accessible to the application host. An R2 replica is a member of a replication pair at a target (remote) site. During normal operations, host IO writes to the R1 replica are mirrored over RDF links to the R2 replica. In general, data on R2 replicas is not available to the host application while the replication relationship is active. In RDF synchronous mode (RDF/S), however, an R2 replica can be in a Read-Only mode that allows a host to read from the R2 replica. An R11 replica is the R1 replica in a storage system having source-target pairings with two target replicas R21, R22. A production dataset such as a host application image stored on storage objects of a replication consistency group (ConGroup) is maintained on the R11 replica and mirrored to the R21 and R22 replicas. Replication between R21 and R22 is not normally active because those replicas mirror R11 directly. However, replication between R21 and R22 may be needed during recovery. As will be explained below, RDF/A RCVY mode and MSC RCVY mode accelerate recovery by reducing the time required to implement replication on the recovery leg.

Intra-regional link 54 between DC1 and DC2 has a maximum allowable physical distance, e.g., 200 km, in order to allow use of RDF/S without unacceptable acknowledgement receipt latency. Inter-regional links 50, 52 do not have such a limit so RDF/A is used. R11 is synchronously replicated to R21 by marking updated tracks of R11 as write-pending until the changes are written to R21. Synchronously replicated host writes are contemporaneously written to both storage arrays in real time before the host application IO completes. Acknowledgments are not sent to the host until the data is stored in cache on both storage arrays, so remote storage array 12 must return an acknowledgement of replication of the changes to storage array 10 before the write-pending flags of updated tracks on R11 can be cleared. Thus, RDF/S maintains a real-time mirror image of data between R1 and R2 devices. R11 is asynchronously replicated to R22 as a dependent-write consistent copy between the R1 and R2 devices. All host writes are collected over a configurable time interval, e.g., from 3-60 seconds, and sent to the remote storage array as a "delta set." Unlike synchronous replication, local storage array 10 does not wait for an acknowledgement of replication of the changes by remote storage array 14 before acknowledging write completion to the host. Asynchronous replication may be more practical to implement than synchronous replication when acknowledgment receipt latency would be too disruptive to host application performance. Acknowledgment receipt latency is at least in part a function of physical distance so inter-region links are subject to greater latency than intra-region links. RDF/A replication on leg 50 is independent of RDF/S replication on leg 54, so R21 and R22 may differ at a given point in time. Differential Data Facility (DDF) software sessions track differences between R21 and R22. DDF sessions are activated at site DC2 at startup and are rotated in coordination with RDF/A cycle switches. One active DDF session is created at site DC3 at startup and is only activated during a ConGroup trip to track writes arriving at DC3 which are not at DC2. Multi-session consistency (MSC) Star software 60 functions to maintain and restore time-consistency between replicas in a replication system in which there are multiple R2s.

RDF/A RCVY mode is enabled on inter-regional recovery leg 52 when operation of the RDF/Star begins. Group-level RCVY flags are set at both sides (DC2, DC3) of the recovery leg 52 to enable all storage objects of the ConGroup to be handled as a set. Group-level personalities of the replicas are set to R1 at both sides of the recovery leg, so replicas R21, R22 both operate as RDF/A-ready R1s relative to each other, including performance of data update Capture cycles and Transmit cycles. However, data updates associated with Transmit cycles are discarded rather than transmitted across leg 52. More specifically, no replication data flows across the recovery leg in either direction during normal operation. Consequently, both R21 and R22 are continuously active and ready as replication sources in RDF/A RCVY mode while leg 52 remains a standby recovery leg. Further, temporary failure of leg 52 will not interrupt the normal function of the storage system because no active replication is being performed across the leg during normal operation.

Instances of MSC RCVY mode software 62 are instantiated on both sides of leg 52 when RDF/Star operation begins. The MSC RCVY mode instances 62 manage RCVY mode MSC groups associated with the host application image. Software definitions associate the MSC Star consistency group with the RCVY mode MSC group. MSC functions to maintain and restore time-consistency between members of the MSC group in a replication system in which there are multiple R2s. For RDF/Star with AutoSwap (CAX), the MSC group runs in high-availability mode with MSC software active at DC1 (primary MSC server) and DC2 (secondary MSC server). Group-level no-track flags are set at both the R1 and R2 sides, indicating that the mirror does not maintain a record of invalid tracks. Further, invalid track counters are reset at both the R1 and R2 sides. The MSC Star instance 60 at DC1 uses CSC to communicate state changes to the MSC RCVY instances 62.

Figure 2:
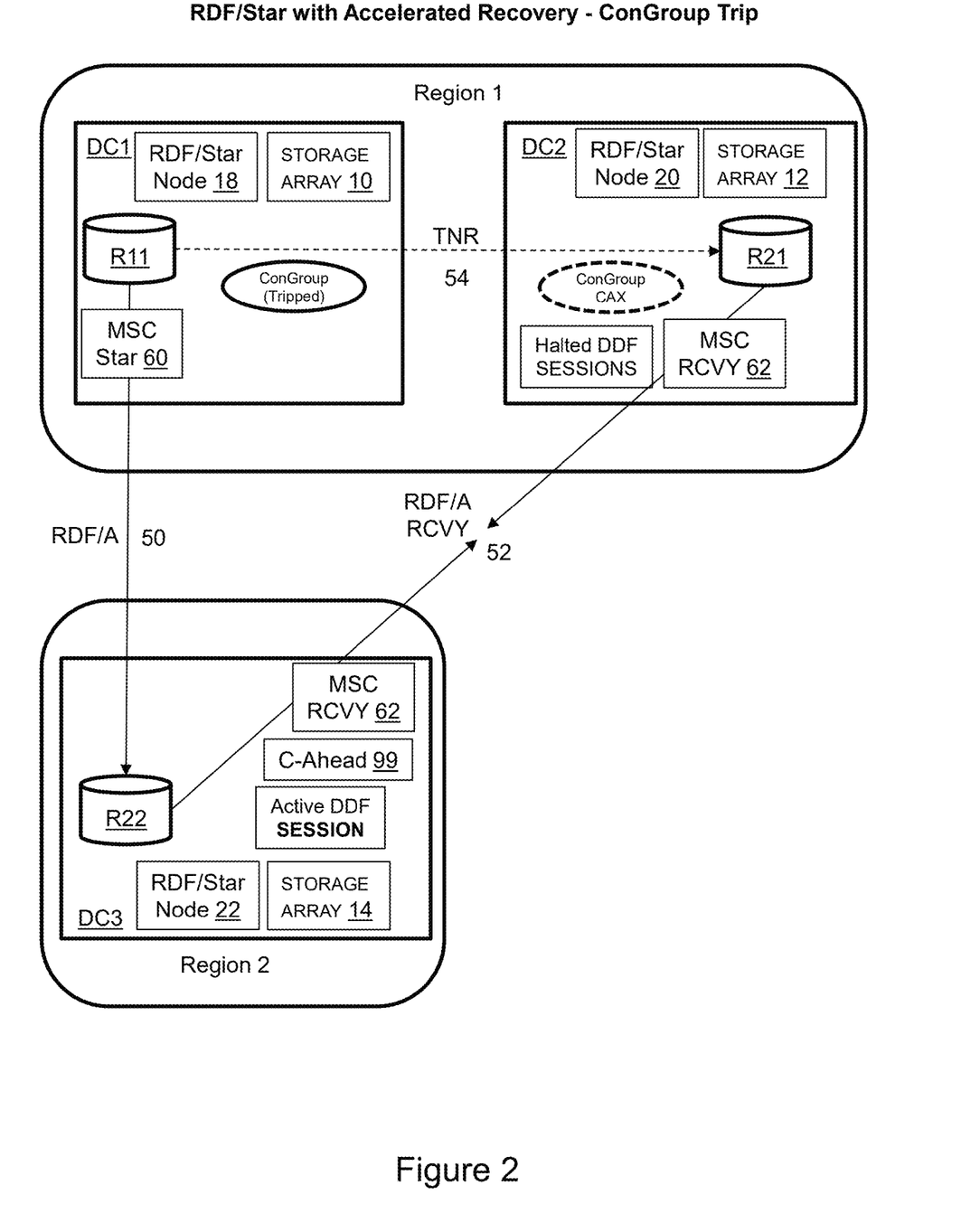
FIG. 2 illustrates a consistency group trip in the RDF/Star configuration of FIG. 1.

FIG. 2 illustrates a consistency group (ConGroup) trip in the RDF/Star configuration of FIG. 1. Tripping of the consistency group may occur when one of the R11 storage objects becomes unable to replicate to the corresponding R21 storage object, e.g., due to a problem in the storage array 10 or inter-array hardware on leg 54. Synchronous replication over leg 54 is halted (the leg transitions into a target not ready (TNR) state). RDF/A sessions are frozen and a ConGroup trip indication is signaled to the MSC Star software 60 running at DC1. MSC responds to the trip indication by enabling a C-ahead flag that indicates that R22 replica is ahead of the R21 replica. The MSC Star software also activates the DC3 DDF session, stops rotating DC2 DDF sessions, and thaws frozen RDF/A sessions so asynchronous replication is performed over leg 50 while replication over leg 54 is halted.

Figure 3:
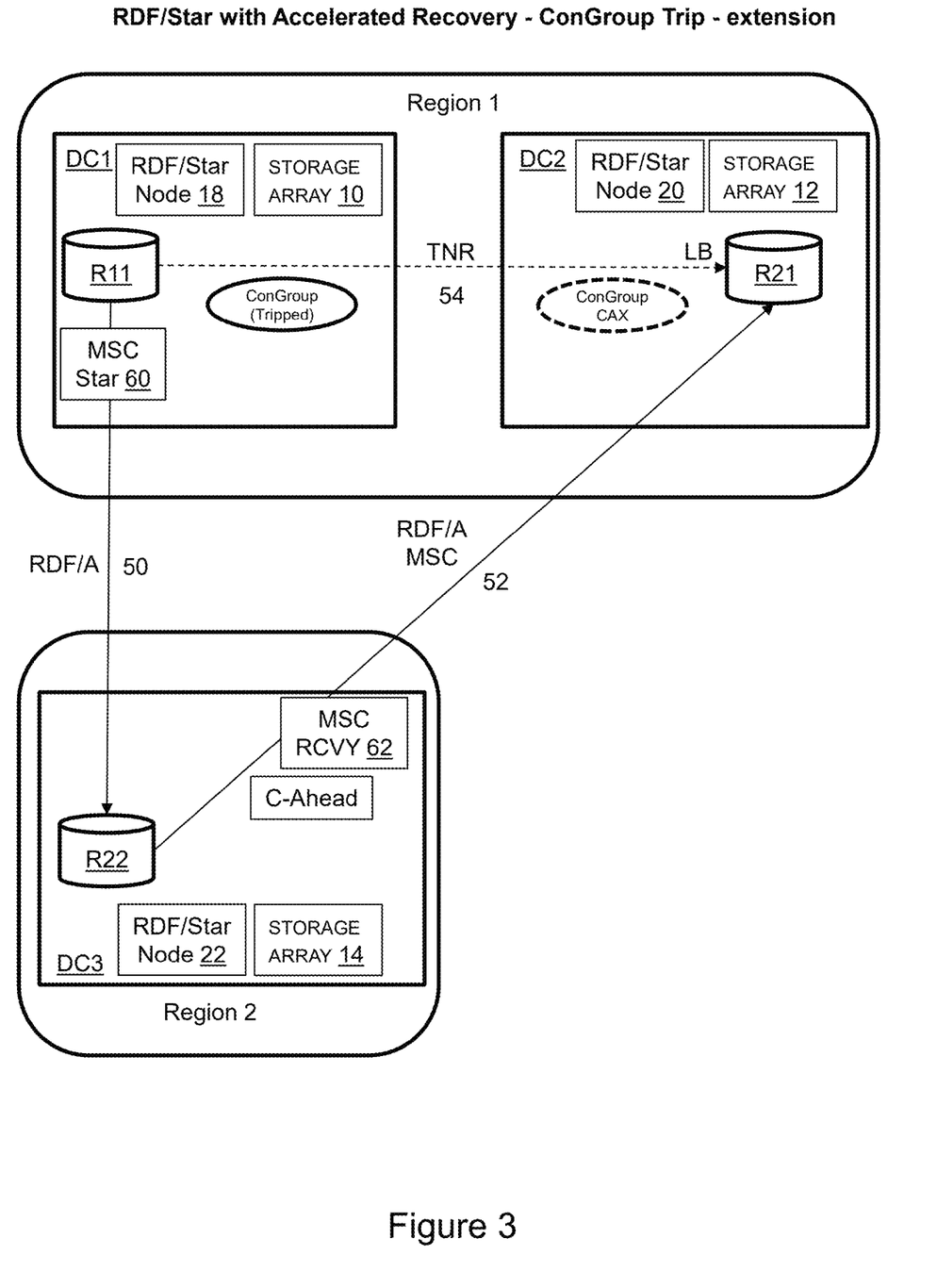
FIG. 3 illustrates accelerated recovery extension enabled by the RDF/A RCVY mode and MSC RCVY mode in response to the consistency group trip shown in FIG. 2.

FIG. 3 illustrates accelerated recovery extension of the RDF/A RCVY mode and MSC RCVY mode to respond to the consistency group trip shown in FIG. 2 by transitioning from RCVY mode into normal MSC mode. If necessary, RDF/A cleanup is performed at the RDF/A target site, which is DC3 in the illustrated example, to ensure that MSC is possible. Group-level no-track flags are cleared at the selected recovery source site, which is DC3 in the illustrated example. DDF session operations are performed to ensure tracks are properly marked for resynchronization in the desired direction according to C-ahead/site-ahead determination. Resynchronization is performed if not recovering at the site with the most recent data. A replica personality swap to R2 is performed at the group-level at the recovery target site (DC2). The Transmit cycle is discarded and becomes the Receive cycle at the recovery target site. The Capture cycle is discarded and becomes the Restore cycle at the recovery target site. Cycle tags are swapped between Receive and Restore cycles to help synchronize cycles between sites. The group-level link-block (LB) flags at the recovery target site are moved to the other mirror (group-level LB flags replace the existing device-level LB flags). Group-level no-track flags are cleared at the recovery target site. Finally, group-level RCVY flags on the R1 and R2 sides are cleared. RDF/A can then operate normally under control of the MSC RCVY software instance running at the recovery source site. In the illustrated example this means that replication data flows from DC3 to DC2 over leg 52.

Figure 4:
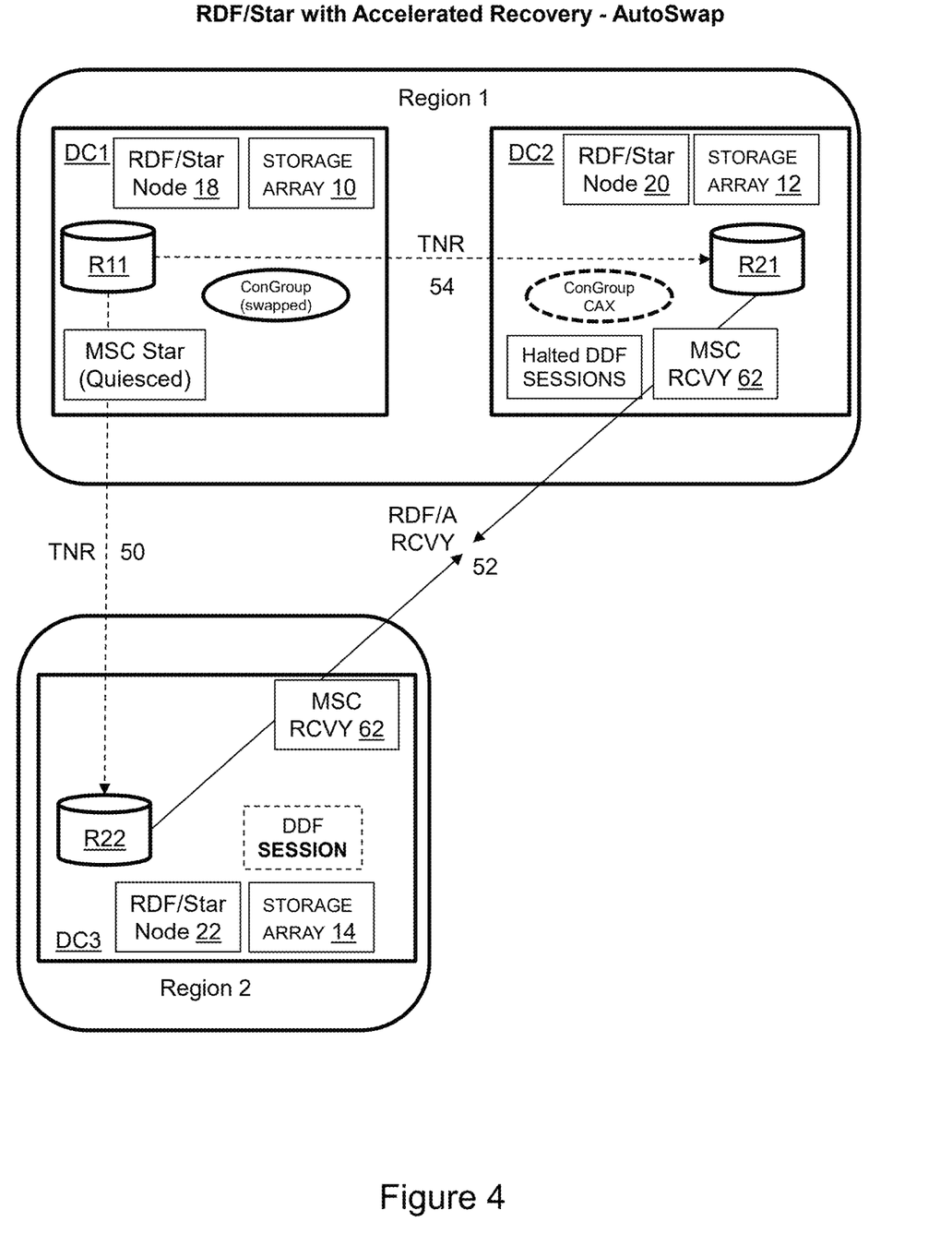
FIG. 4 illustrates an auto-swap in the RDF/Star configuration of FIG. 1.

FIG. 4 illustrates an auto-swap in the RDF/Star configuration of FIG. 1. Star-mode RDF/A sessions are dropped due to auto-swap device conditioning. The MSC Star software detects the UCB swap resulting from the auto-swap, stops rotating DC2 DDF sessions, and goes into a deactivated state.

Figure 5:
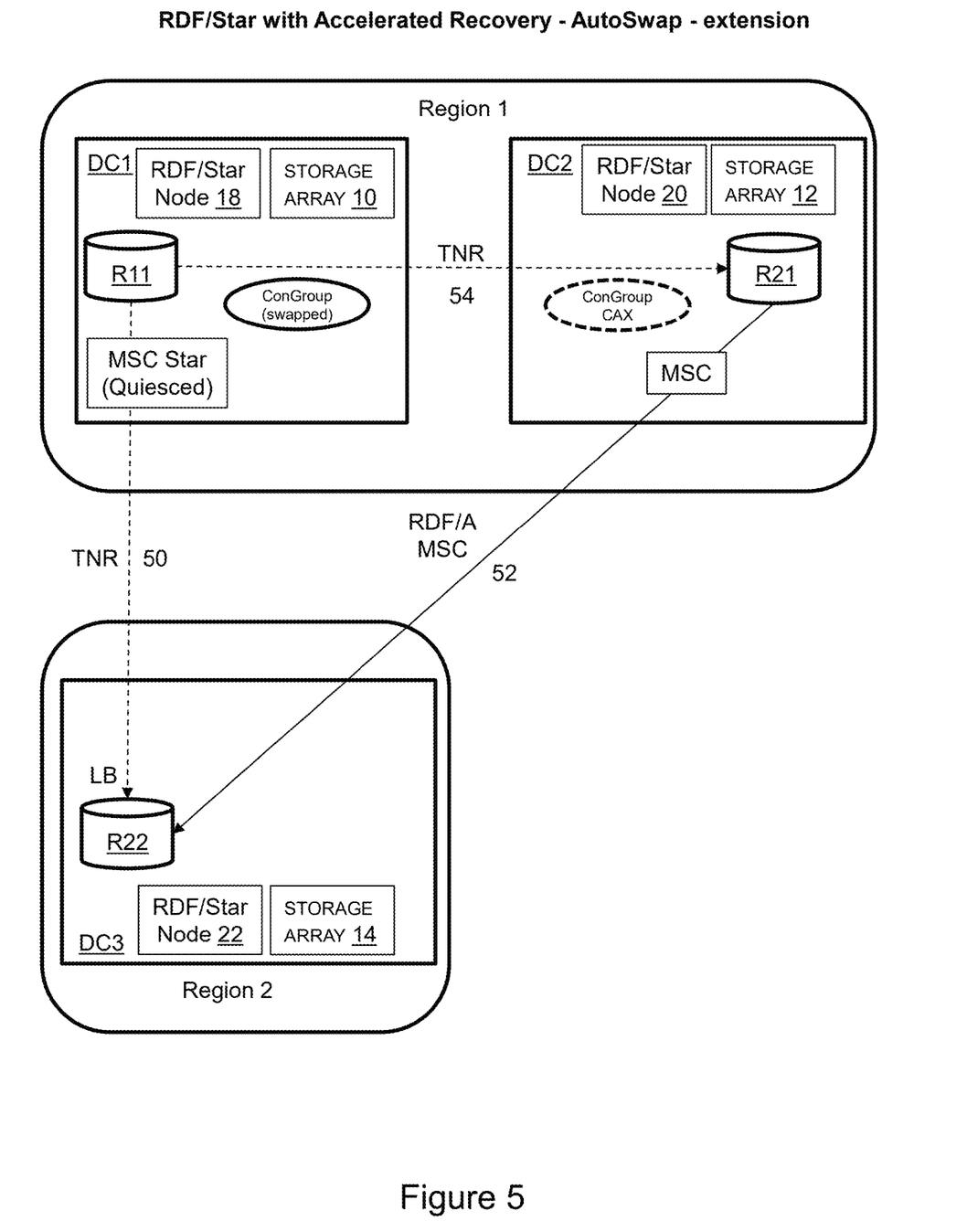
FIG. 5 illustrates accelerated recovery extension enabled by the RDF/A RCVY mode and MSC RCVY mode in response to the auto-swap shown in FIG. 4.

FIG. 5 illustrates use of the RDF/A RCVY mode and MSC RCVY mode with the auto-swap shown in FIG. 4. The general functions for transitioning to normal MSC mode have already been described above. MSC Star mode software signals the MSC RCVY instance at DC2 to initiate recovery operations using DC2 as the source site to feed DC3. The MSC RCVY instance performs the transition from RCVY mode to normal MSC mode as described previously but with replication data flowing from DC2 to DC3 over leg 52.

Figure 6:
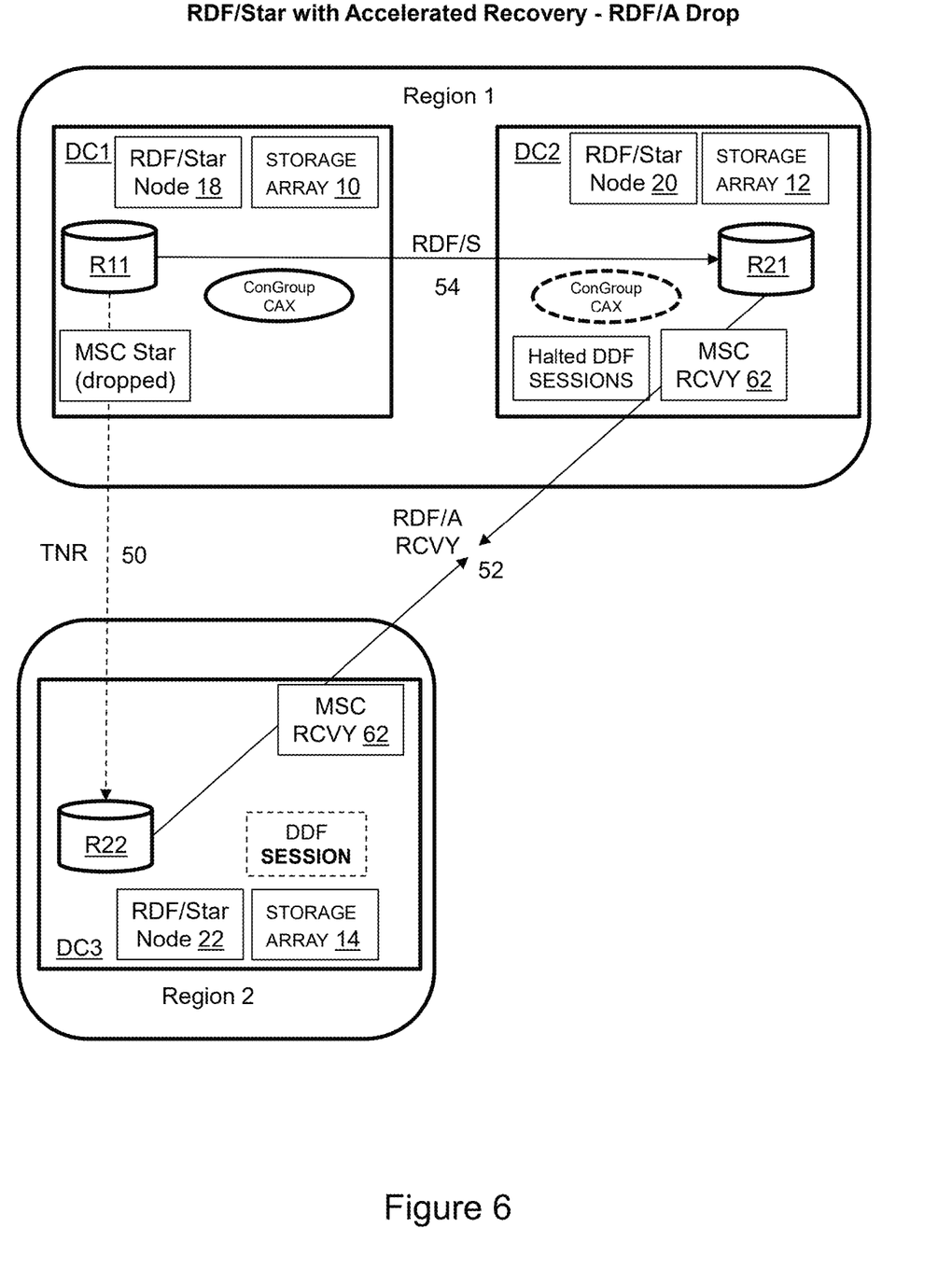
FIG. 6 illustrates an RDF/A Drop in the RDF/Star configuration of FIG. 1.

FIG. 6 illustrates an RDF/A Drop in the RDF/Star configuration of FIG. 1. MSC Star observes the Drop of an RDF/A session and attempts to Drop all the remaining sessions included in the MSC group definition, performs RDF/A cleanup to the extent allowed by RDF link status, and stops rotating DDF sessions.

Figure 7:
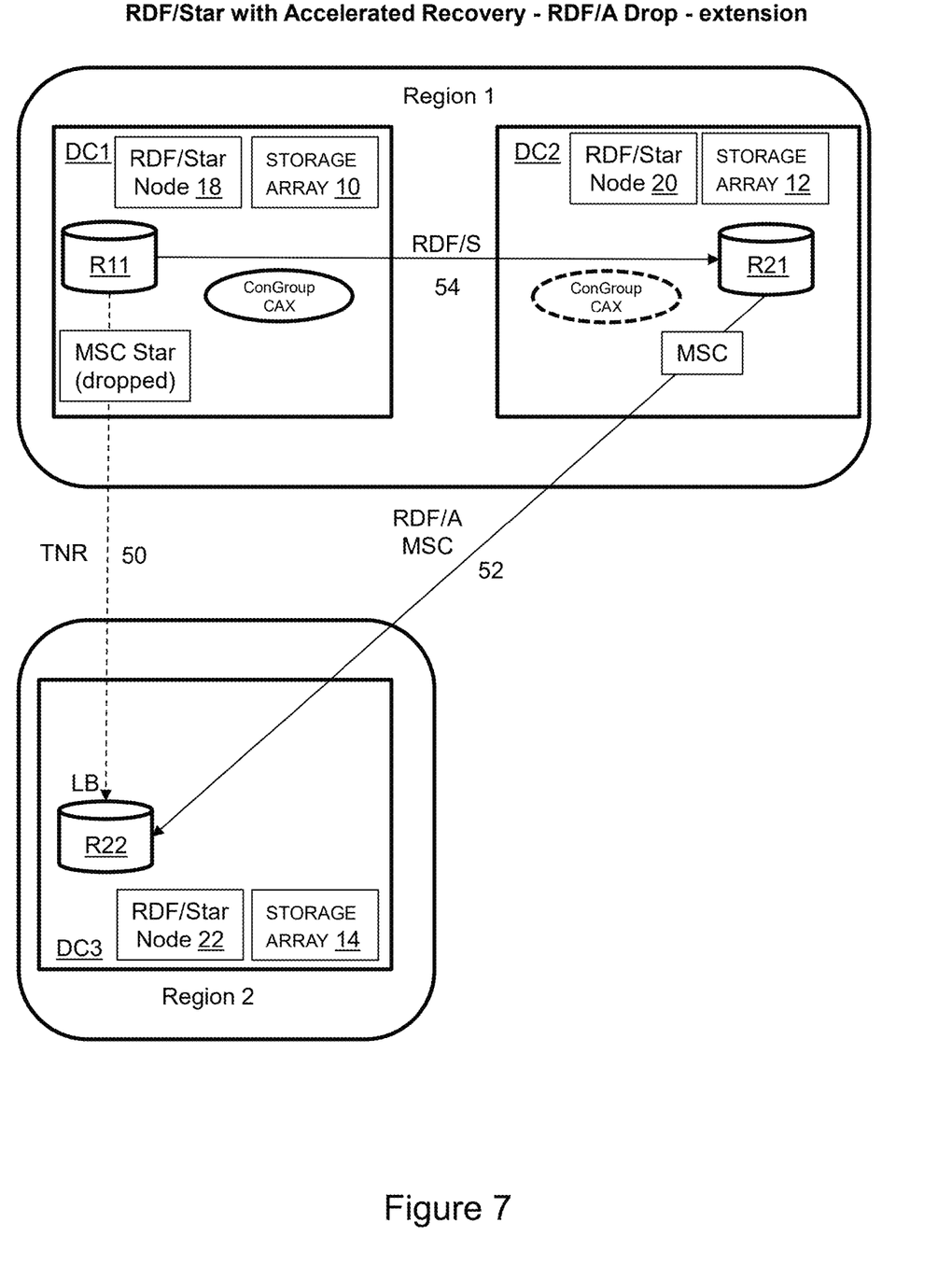
FIG. 7 illustrates accelerated recovery extension enabled by the RDF/A RCVY mode and MSC RCVY mode in response to the RDF/A Drop shown in FIG. 6.

FIG. 7 illustrates use of the RDF/A RCVY mode and MSC RCVY mode with the RDF/A Drop shown in FIG. 6 to accelerate the recovery of RDF/A replication on recovery leg 52. The MSC RCVY instance at DC2 initiates recovery operations using DC2 as the source site to feed DC3. The MSC RCVY instance at DC2 performs RDF/A cycle resolution at DC3 to remove any host intervention required status. RCVY mode then transitions to normal MSC mode as described previously.

Figure 8:
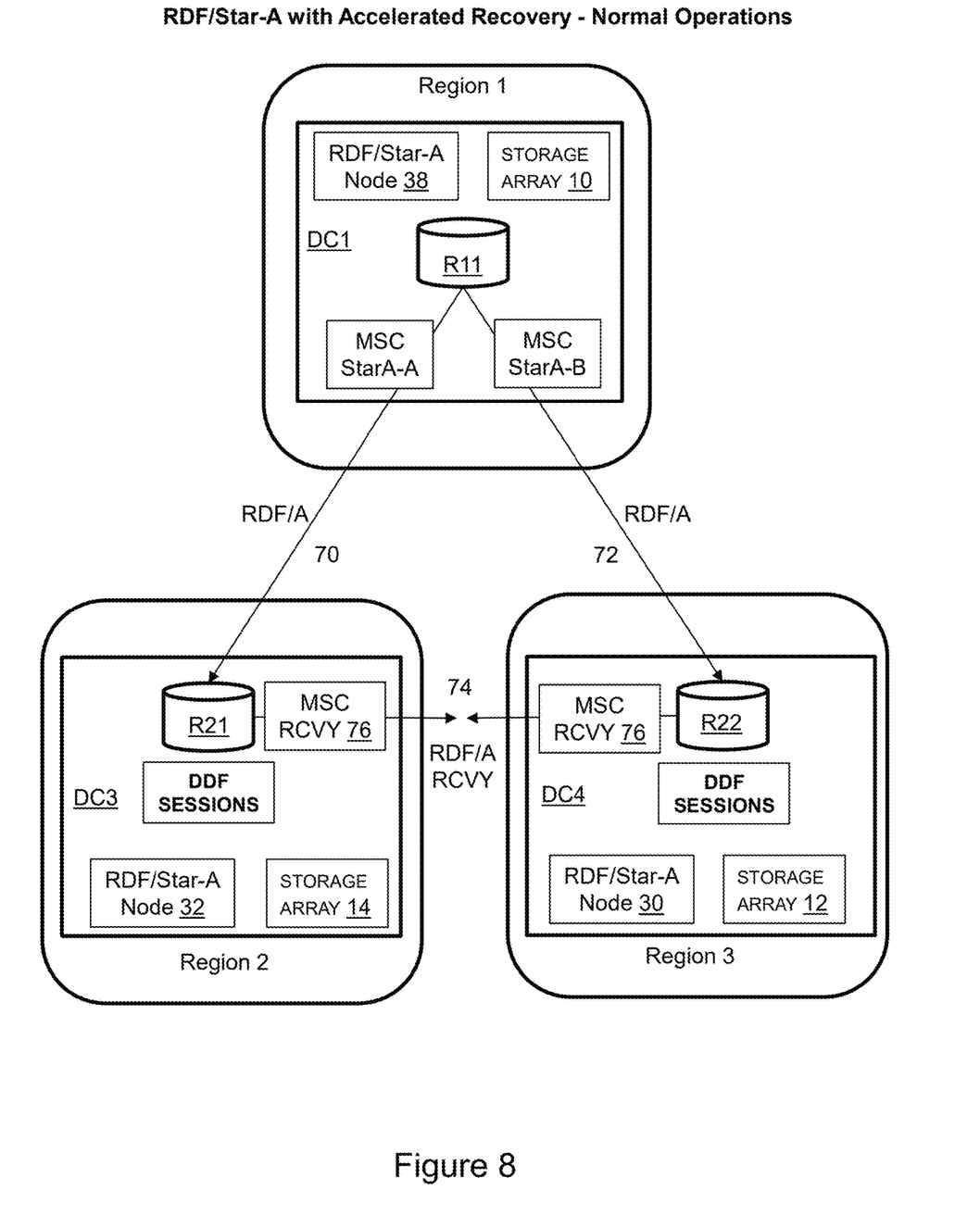
FIG. 8 illustrates normal operations in an RDF/Star-A configuration with RDF/A RCVY mode and MSC RCVY mode.

FIG. 8 illustrates an RDF/Star-A configuration with RDF/A RCVY mode and MSC RCVY mode. RDF/Star-A includes three data centers DC1, DC3, DC4 that are in three geographic regions labelled as region 1, region 2, and region 3. Specifically, DC1 is in region 1, DC3 is in region 2, and DC4 is in region 3. DC1, which is a primary site, includes a storage array 10 and RDF/Star-A node 38. DC4, which is a secondary site, includes a storage array 12 and RDF/Star node 30. DC3, which is a secondary site, includes a storage array 14 and RDF/Star-A node 32. The RDF/Star-A nodes 38, 30, 32 may be implemented on separate logical partitions of different mainframe computers at different sites. Each RDF/Star-A node monitors its local datacenter for failures such as inter-datacenter communication failures and failures associated with the local storage arrays. R11 is asynchronously replicated by R21 over leg 70. R11 is asynchronously replicated by R22 over leg 72. Leg 74 is the recovery leg. Apart from the absence of a synchronous leg, operation is as previously described with regard to RDF/Star with the exception of the DDF session management. In RDF/Star-A, there are two active rotating DDF sessions at both DC3 and DC4. The DC3 DDF sessions are under control of the DC1 to DC4 RDF/A subtask of RDF/Star-A. The DC4 DDF sessions are under control of the DC1 to DC3 RDF/A subtask of RDF/Star-A. The DC3 DDF sessions track writes that may not be at DC4. The DC4 DDF session track writes that may not be at DC3.

Figure 9:
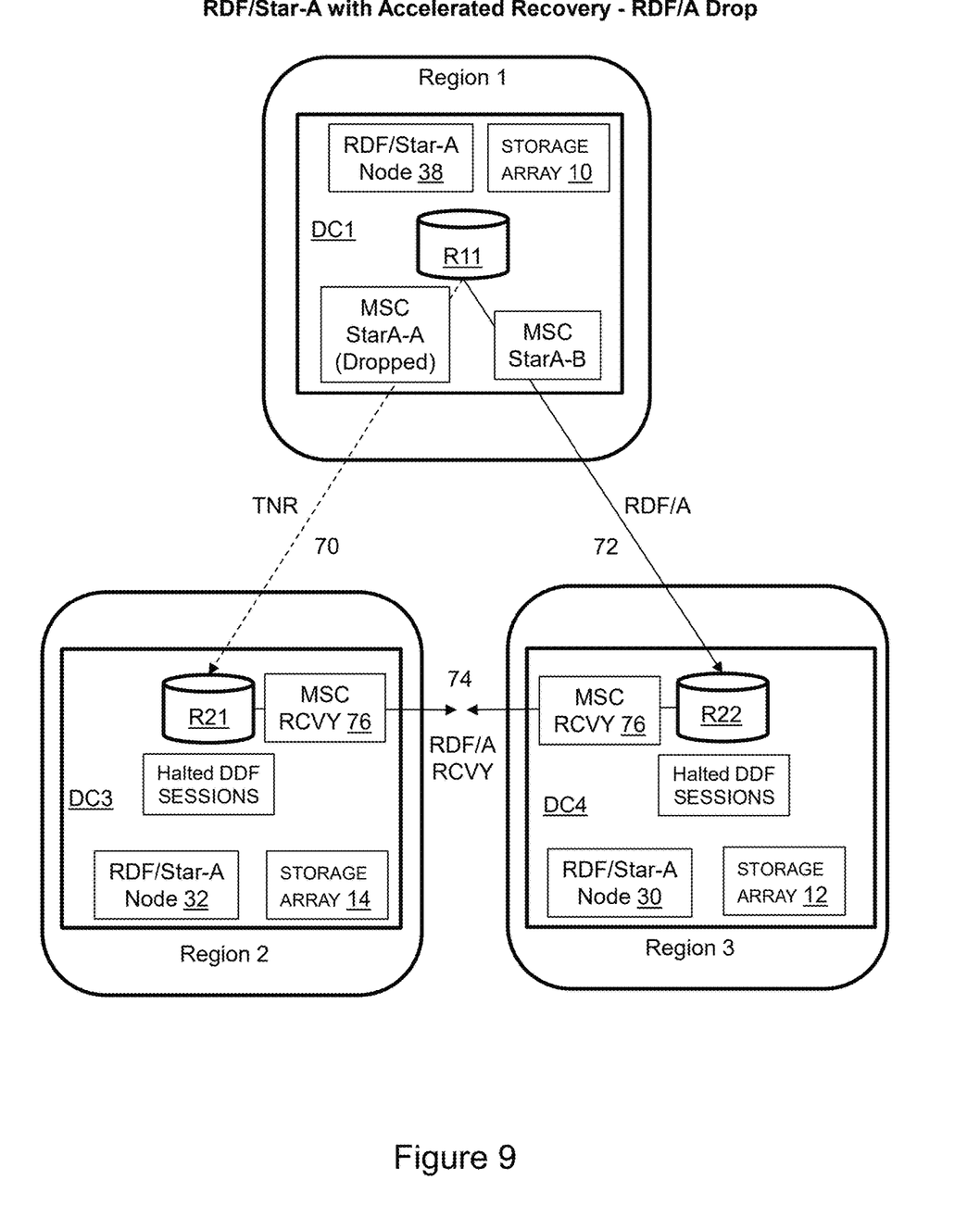
FIG. 9 illustrates an RDF/A Drop in the RDF/Star-A configuration of FIG. 8.

FIG. 9 illustrates an RDF/A Drop in the RDF/Star-A configuration of FIG. 8. Handling of the RDF/A Drop is the same as described above with regard to RDF/Star. In the illustrated example, leg 70 enters a TNR state and MSC StarA-A senses the Drop.

Figure 10:
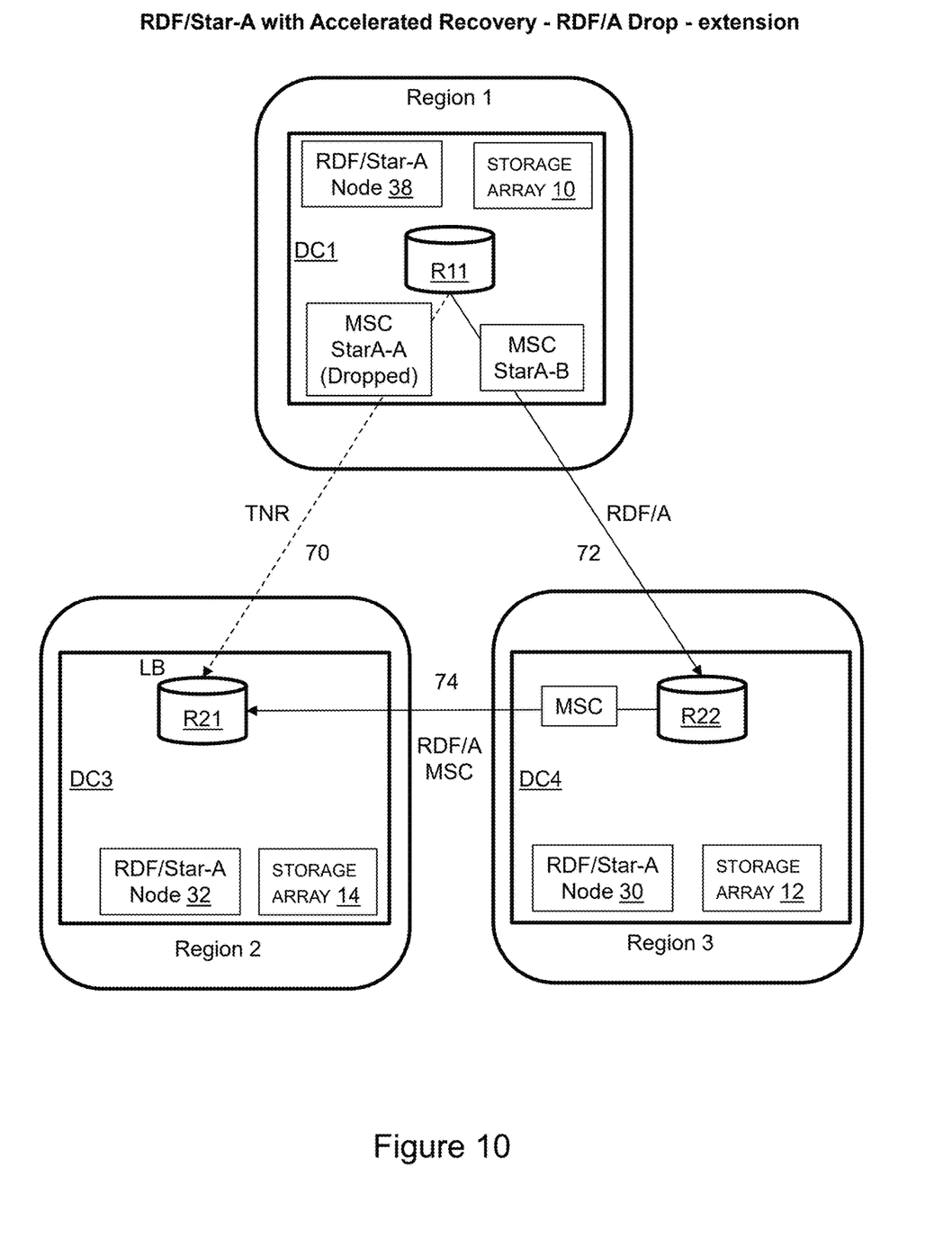
FIG. 10 illustrates accelerated recovery extension enabled by the RDF/A RCVY mode and MSC RCVY mode in response to the RDF/A Drop shown in FIG. 9.

FIG. 10 illustrates use of the RDF/A RCVY mode and MSC RCVY mode with the RDF/A Drop shown in FIG. 9 to accelerate the recovery of RDF/A over the recovery leg. The MSC RCVY instance 76 at the unaffected Star-A RDF/A target site initiates recovery operations to feed the affected Star-A RDF/A target site. The MSC RCVY instance 76 at the unaffected Star-A RDF/A target site performs RDF/A cycle resolution at the affected Star-A SRDF/A target site to remove any host intervention required status and then transitions to normal MSC mode as described previously but with data flowing from the unaffected Star-A RDF/A target site to the affected Star-A RDF/A target site. In the illustrated example, R22 is asynchronously replicated by R21 over leg 74.

Figure 11:
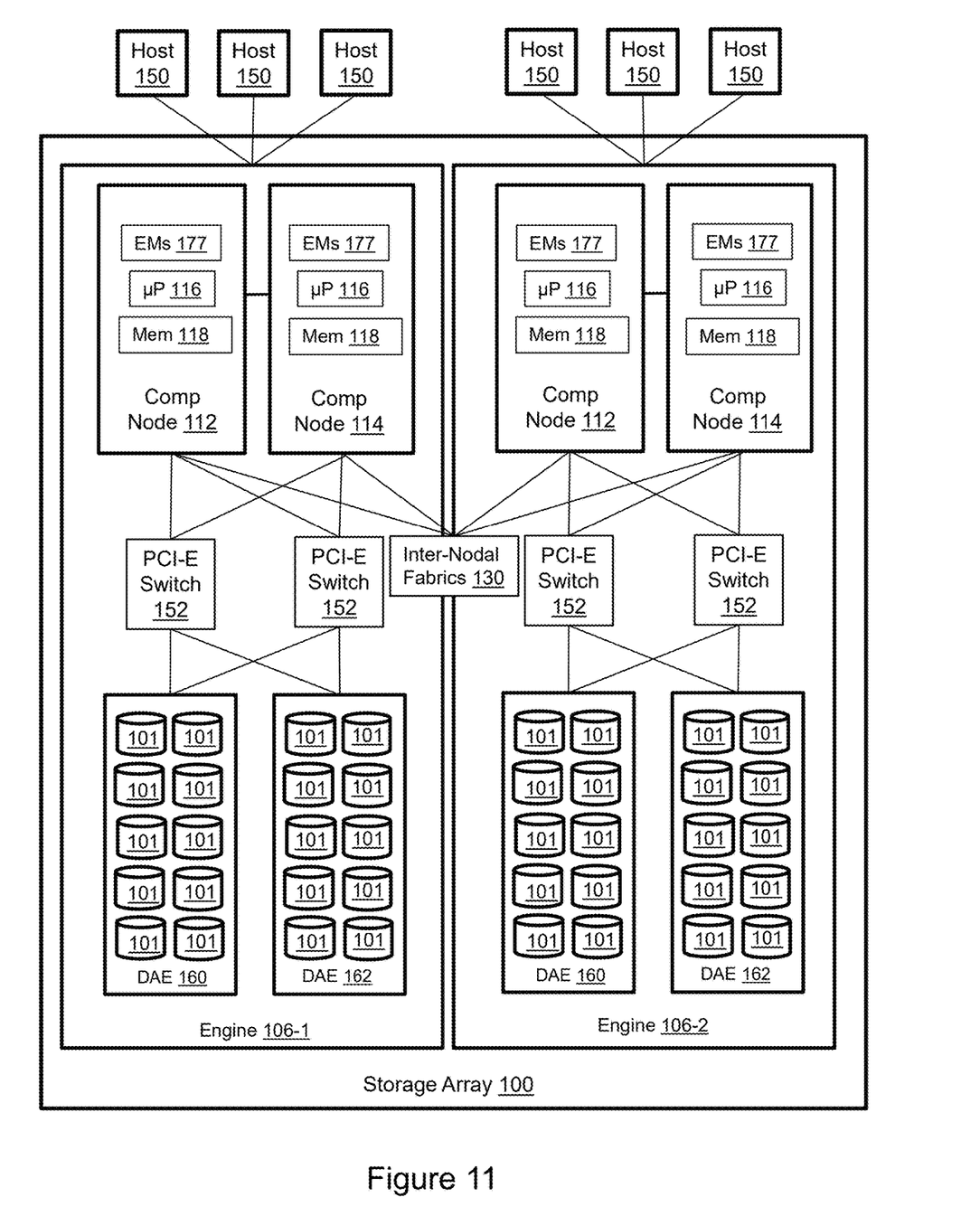
FIG. 11 illustrates a storage array.

FIG. 11 illustrates an example of a storage array 100 in greater detail. The illustrated storage array 100 is shown with two engines 106-1, 106-2, but might include any number of engines. Each engine includes disk array enclosures (DAEs) 160, 162 and a pair of peripheral component interconnect express (PCI-e) interconnected compute nodes 112, 114 (aka storage directors) in a failover relationship. Within each engine, the compute nodes and DAEs are interconnected via redundant PCI-E switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory. Each compute node is implemented as a separate printed circuit board and includes resources such as at least one multi-core processor 116 and local memory 118. Processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory 118 to a shared memory that can be accessed by all compute nodes of the storage array. Each compute node includes one or more adapters and ports for communicating with host servers 150 for servicing IOs from the host servers. Each compute node also includes one or more adapters for communicating with other compute nodes via redundant inter-nodal channel-based InfiniBand fabrics 130. Each compute node 112, 114 runs emulations (EMs 177) for completing different storage-related tasks and functions. Front-end emulations handle communications with the host servers 150. For example, front-end emulations receive IO commands from host servers and return data and write acknowledgements to the host servers. Back-end emulations handle communications with managed drives 101 in the DAEs 160, 162. Data services emulations process IOs. Remote data services emulations handle communications with other storage systems, e.g., other storage arrays for remote replication and remote snapshot creation.

Figure 12:
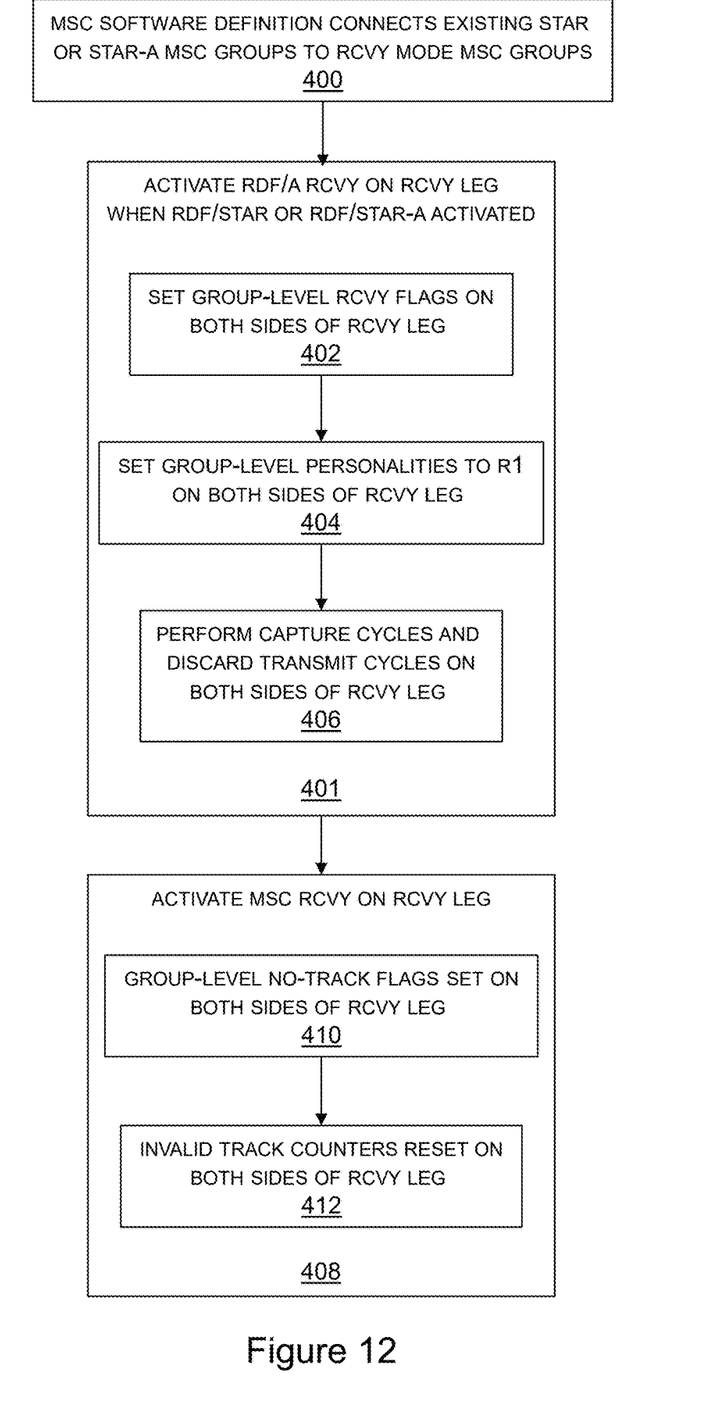
FIG. 12 illustrates a method for configuring RDF/A RCVY mode and MSC RCVY mode.

FIG. 12 illustrates a method for implementing RDF/A RCVY mode and MSC RCVY mode. As indicated in step 400, the MSC software definition is created to connect existing RDF/Star or RDF/Star-A MSC groups to RCVY mode MSC groups. Step 401 is activating RDF/A RCVY on the recovery leg when RDF/Star or RDF/Star-A is activated. This includes instantiating MSC RCVY mode instances on both sides of the recovery leg when the RDF/Star or RDF/Star-A is activated. Consequently, accelerated recovery is available with one-time startup. Sub-step 402 is setting group-level RCVY flags on both sides of the recovery leg. Preparation for group-level actions helps to avoid time-consuming per-storage object actions. Sub-step 404 is setting group-level personalities to R1 on both sides of the recovery leg. The R1s on both sides of the recovery leg will then perform Capture cycles as indicated in sub-step 406 but discard transmit cycles. MSC RCVY is activated on the recovery leg as indicated in step 408. Sub-step 410 is setting group level no-track flags on both sides of the recovery leg so that invalid tracks are not recorded. As indicated in sub-step 412, invalid track counters are reset on both sides of the recovery leg. Invalid tracks would include tracks that are updated locally but not yet replicated by the corresponding mirror.

Figure 13:
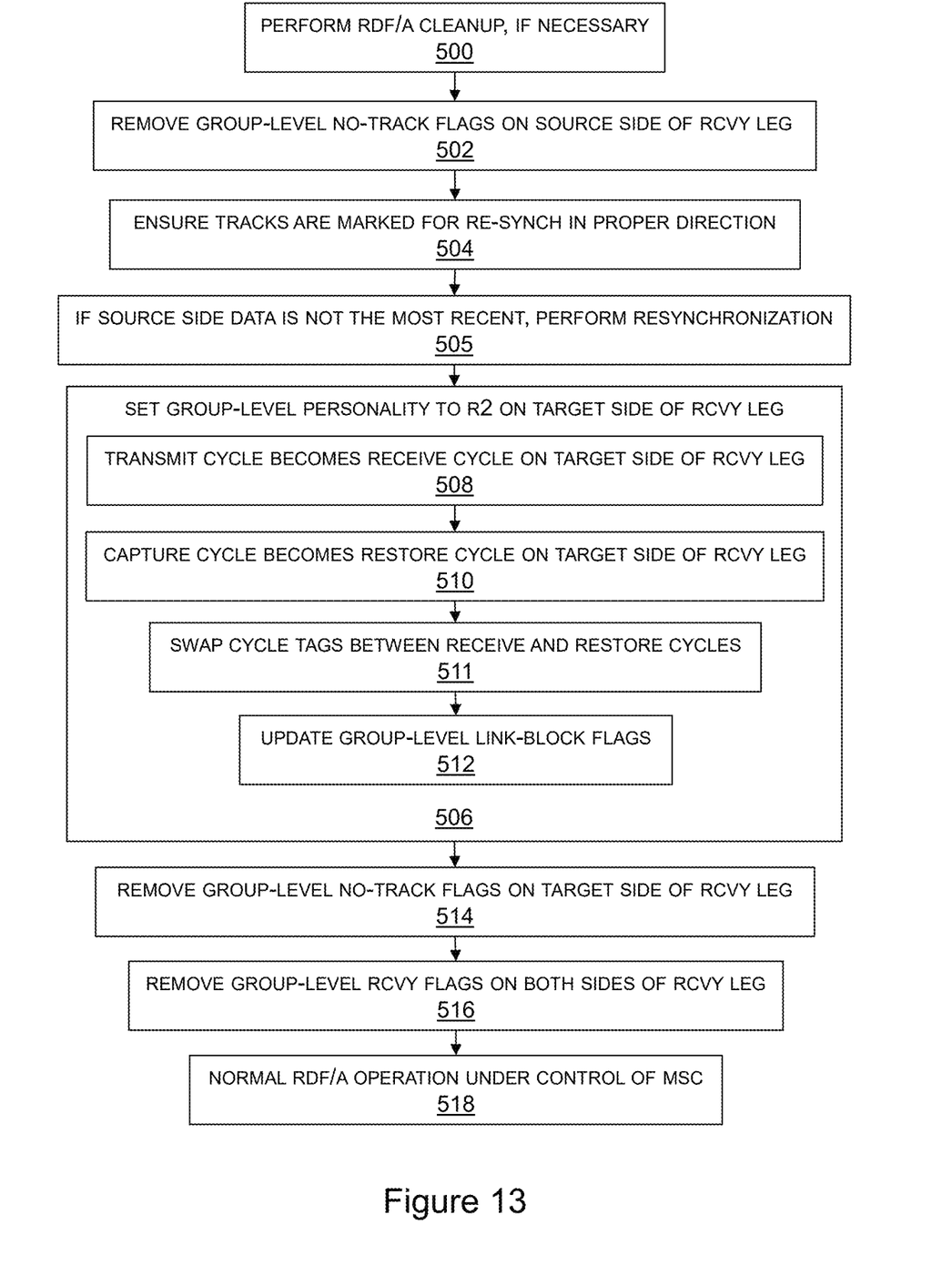
FIG. 13 illustrates a method for using RDF/A RCVY mode and MSC RCVY mode for accelerated recovery.

FIG. 13 illustrates a method for using RDF/A RCVY mode and MSC RCVY mode. As indicated in step 500, RDF/A cleanup is performed, if necessary. Group-level no-track flags are removed on the source side of the recovery leg as indicated in step 502. Step 504 is ensuring that tracks are marked for re-synch in the proper direction. As previously described, C-ahead is used to indicate, for example, that an asynchronous leg has moved ahead of a halted synchronous leg. If local-side data is not the most recent, then resynchronization is performed as indicated in step 505. Step 506 is setting group-level personalities to R2 on the target side of the recovery leg. As indicated in sub-step 508, Transmit cycles become Receive cycles on the target side of the recovery leg. Further, Capture cycles become Restore cycles on the target side of the recovery leg as indicated in sub-step 510. Sub-step 511 is swapping cycle tags between receive and restore cycles. As indicated in sub-step 512, the group-level link block flags are updated, e.g., moved to the other mirror. Group-level no-track flags are cleared at the recovery target site as indicated in step 514. Finally, group-level RCVY flags on the R1 and R2 sides are cleared as indicated in step 516. Normal RDF/A operation then proceeds under control of the MSC RCVY software instance at the selected recovery source site as indicated in step 518.

Specific examples have been presented to provide context and convey inventive concepts. The specific examples are not limiting. A wide variety of modifications may be made without departing from the scope of the inventive concepts described herein. Moreover, the features, aspects, implementations, and embodiments described herein may be combined in any technically possible way. Accordingly, modifications and combinations are within the scope of the following claims.

What is claimed is:

1. A method comprising:
   setting personalities of corresponding replicas of a mirror to R1 on both sides of a recovery leg at activation time;
   performing capture cycles on both sides of the recovery leg; and
   discarding transmit cycles on both sides of the recovery leg.

2. The method of claim 1 further comprising setting group-level RCVY flags on both sides of the recovery leg at activation time.

3. The method of claim 2 further comprising setting group-level no-track flags on both sides of the recovery leg at activation time.

4. The method of claim 3 further comprising resetting invalid track counters on both sides of the recovery leg at activation time.

5. The method of claim 4 further comprising setting group-level personalities of the replicas on the target side of the recovery leg to R2 during a recovery operation;
   converting the transmit cycles to receive cycles on the target side of the recovery leg;
   converting the capture cycles to restore cycles on the target side of the recovery leg;
   swapping the cycle tags between the receive and restore cycles on the target side of the recovery leg; and
   updating the group-level link-block flags on the target side of the recovery leg.

6. The method of claim 5 further comprising removing the group-level no-track flags on both sides of the recovery leg during the recovery operation.

7. The method of claim 6 further comprising marking tracks for re-synchronization in the proper direction during the recovery operation; and
   performing resynchronization if the source side data is not the most recent.

8. The method of claim 7 further comprising removing the group-level RCVY flags on both sides of the recovery leg during the recovery operation.

9. An apparatus comprising:
   a data storage system with a plurality of storage arrays and Star nodes at datacenters in a Star or Star-A configuration with a recovery leg configured in a RCVY mode in which multi-session consistency software instances run at datacenters at both ends of the recovery leg, personalities of corresponding replicas of a mirror are set to R1 on both sides of a recovery leg at activation time, capture cycles are performed on both sides of the recovery leg, and transmit cycles are discarded on both sides of the recovery leg.

10. The apparatus of claim 9 further comprising group-level RCVY flags set on both sides of the recovery leg at activation time.

11. The apparatus of claim 10 further comprising group-level no-track flags set on both sides of the recovery leg at activation time.

12. The apparatus of claim 11 further comprising invalid track counters reset on both sides of the recovery leg at activation time.

13. The apparatus of claim 12 further comprising group-level personalities of the replicas on the target side of the recovery leg set to R2 during a recovery operation;
the transmit cycles are converted to receive cycles on the target side of the recovery leg;
the capture cycles are converted to restore cycles on the target side of the recovery leg;
the cycle tags swapped between the receive and restore cycles on the target side of the recovery leg; and
updated group-level link-block flags on the target side of the recovery leg.

14. The apparatus of claim 13 further comprising the group-level no-track flags and group-level RCVY flags on both sides of the recovery leg being removed during the recovery operation.

15. The apparatus of claim 14 further comprising tracks marked for re-synchronization in the proper direction during the recovery operation; and
resynchronization being performed if the source side data is not the most recent.

16. A non-transitory computer-readable storage medium that stores instructions that when executed by at least one computer in a storage system performs a method comprising:
setting personalities of corresponding replicas of a mirror to R1 on both sides of a recovery leg at activation time;
performing capture cycles on both sides of the recovery leg; and
discarding transmit cycles on both sides of the recovery leg.

17. The non-transitory computer-readable storage medium of claim 16 in which the method further comprises setting group-level RCVY flags on both sides of the recovery leg at activation time.

18. The non-transitory computer-readable storage medium of claim 17 in which the method further comprises setting group-level no-track flags on both sides of the recovery leg at activation time.

19. The non-transitory computer-readable storage medium of claim 18 in which the method further comprises resetting invalid track counters on both sides of the recovery leg at activation time.

20. The non-transitory computer-readable storage medium of claim 19 in which the method further comprises:
setting group-level personalities of the replicas on the target side of the recovery leg to R2 during a recovery operation;
converting the transmit cycles to receive cycles on the target side of the recovery leg;
converting the capture cycles to restore cycles on the target side of the recovery leg;
swapping the cycle tags between the receive and restore cycles on the target side of the recovery leg;
updating the group-level link-block flags on the target side of the recovery leg;
removing the group-level no-track flags on both sides of the recovery leg during the recovery operation;
marking tracks for re-synchronization in the proper direction during the recovery operation;
performing resynchronization if the source side data is not the most recent; and
removing the group-level RCVY flags on both sides of the recovery leg during the recovery operation.

* * * * *